United States Patent [19]

Pittinger, Jr.

[11] 3,977,078
[45] Aug. 31, 1976

[54] GRASS CUTTING CHAIN SAW DRIVE SYSTEM

[76] Inventor: Charles B. Pittinger, Jr., 320 Cockeys Mill Road, Reisterstown, Md. 21136

[22] Filed: June 17, 1975

[21] Appl. No.: 587,649

[52] U.S. Cl. .................................. 30/276; 30/500; 56/16.9
[51] Int. Cl.² ................... A01D 35/26; B26B 25/00
[58] Field of Search ............. 30/276, 347, 500, 264, 30/263; 56/16.9, 17.2, 17.5, 255

[56] References Cited
UNITED STATES PATENTS

| | | | |
|---|---|---|---|
| 2,263,431 | 11/1941 | White | 30/276 X |
| 2,648,187 | 8/1953 | Ries | 56/16.9 |
| 2,697,457 | 12/1954 | Lawrence | 30/264 X |
| 2,746,227 | 5/1956 | Tower | 56/255 X |
| 2,832,184 | 4/1958 | Beuerle | 56/17.2 |
| 2,881,519 | 4/1959 | Gardner | 30/500 X |
| 3,158,933 | 12/1964 | Davis | 30/276 |
| 3,346,955 | 10/1967 | Beneke | 30/276 |

Primary Examiner—Al Lawrence Smith
Assistant Examiner—J. C. Peters
Attorney, Agent, or Firm—John F. McClellan, Sr.

[57] ABSTRACT

A chain saw drive having a unitary quick-attach, quick-detach grasscutting adapter including a cutter head driven by a flexible cable coupled with the output of the chain saw drive by a complementary fitting and supported inside a tubular member clamped to the chainsaw frame and extending in a downward arc toward the ground; bearings and spacers sequentially assembled into the tubular member-journal the flexible cable; the upper end of the tubular member has an integral clamp detachably affixed to the chain saw frame at attachment points customarily supplied with portable chain saw frames; a relatively long handle extending rearwardly of the frame on one end and a loop handle integral with the chainsaw drive on the other end provide manual grips for the assembly, which preferably is supplied with a filament-type cutter head for safety but which can be used with other cutting heads; a support at the cutter head is also disclosed.

12 Claims, 5 Drawing Figures

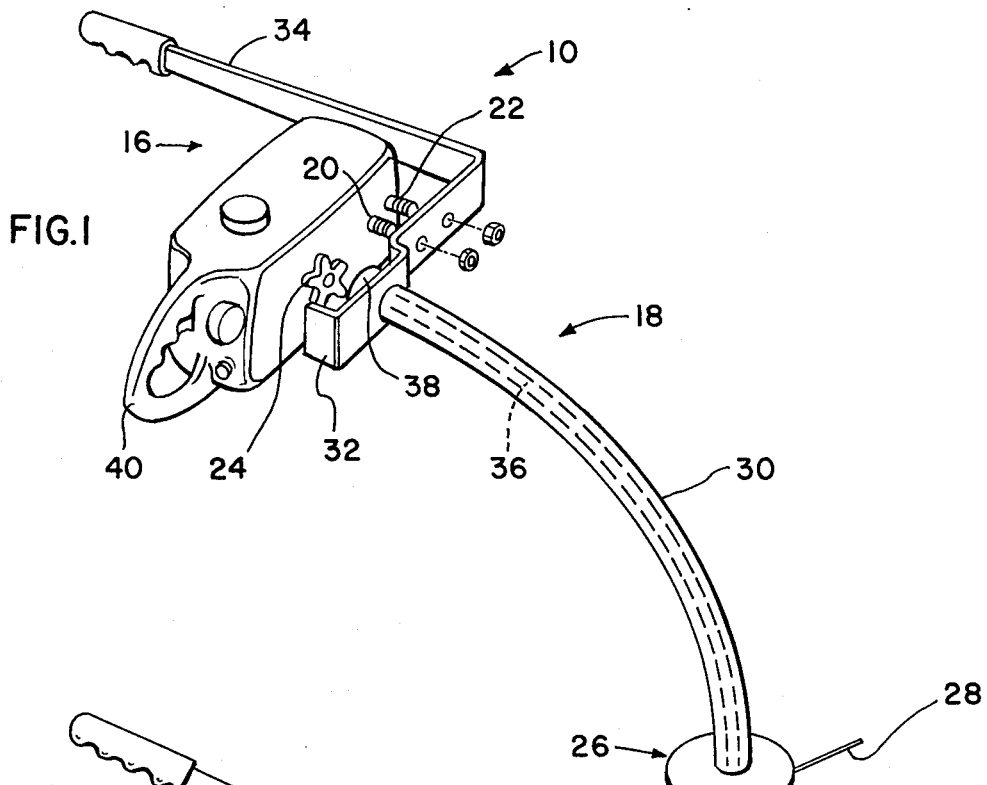
FIG.1
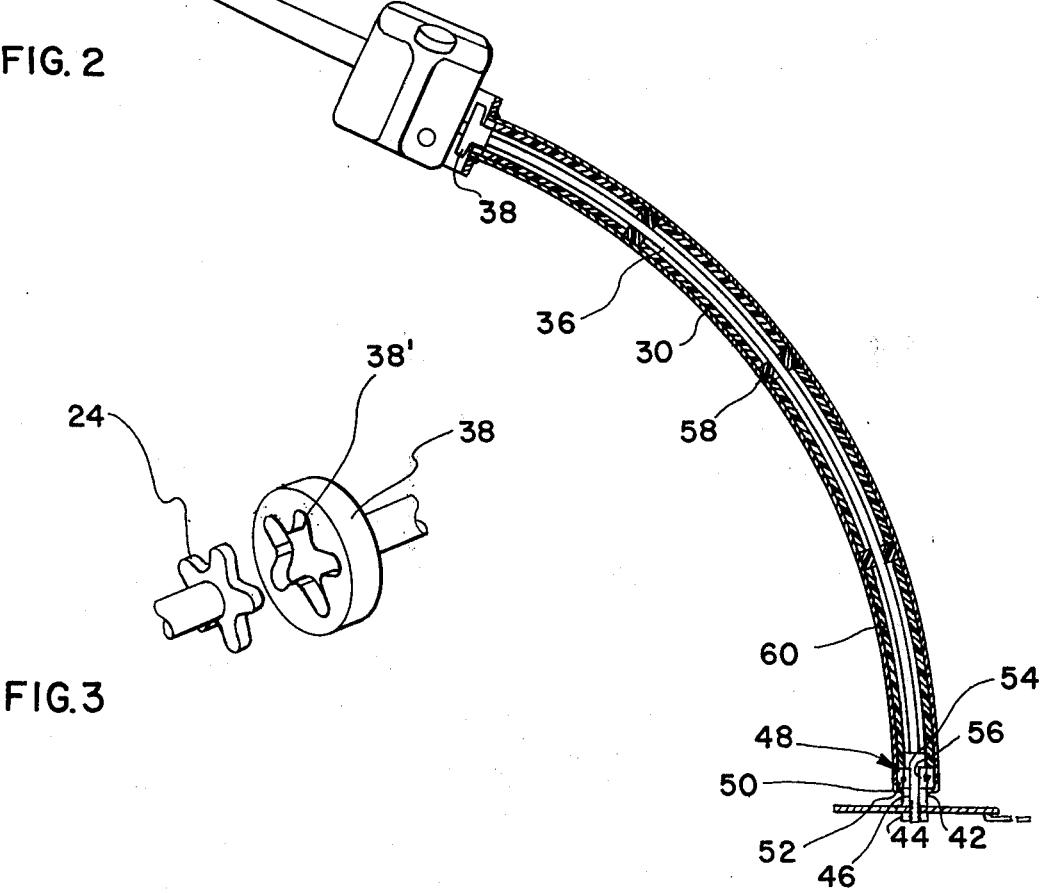
FIG.2
FIG.3

GRASS CUTTING CHAIN SAW DRIVE SYSTEM

Cross-reference is made to my Applications for U.S. Pat. as follows: Ser. No. 514,560, filed Oct. 15, 1974, now U.S. Pat. No. 3,895,440 for DISK FOR FILAMENT TRIMMER, and Ser. No. 514,561, filed Oct. 15, 1974 now U.S. Pat. No. 3,928,911 for HOLLOW-SHAFT FEED FILAMENT TRIMMER,, and my application Ser. No. 587,648 filed concurrently with the present Application and entitled FILAMENT-WOUND PERFORATE PLATE SYSTEM.

This invention relates generally to portable tools for cutting and specifically to vegetation cutting equipment.

A principal object of this invention is to provide a new portable cutter in the form of a chain saw drive with a bolt-on vegetation-cutting adapter which is a self-contained unit.

Another object is to exploit the widespread availability, interchangeability, lightness of weight, universal orientability and power of the ordinary chain saw drive for purposes of cutting natural growth other than trees, limbs and branches and particularly to adapt it for cutting green growth such as grass and weeds.

Further objects are to provide a system as described which is easy, efficient, durable and safe to use, and economical to buy.

Other objects and advantages of the invention will become apparent on examination of the following description, including the drawings in which like reference numerals refer to like parts:

FIG. 1 is an isometric exploded view of the system as a whole;

FIG. 2 is a side elevation partly in section;

FIG. 3 is a fragmentary isometric detail;

Figure 4:
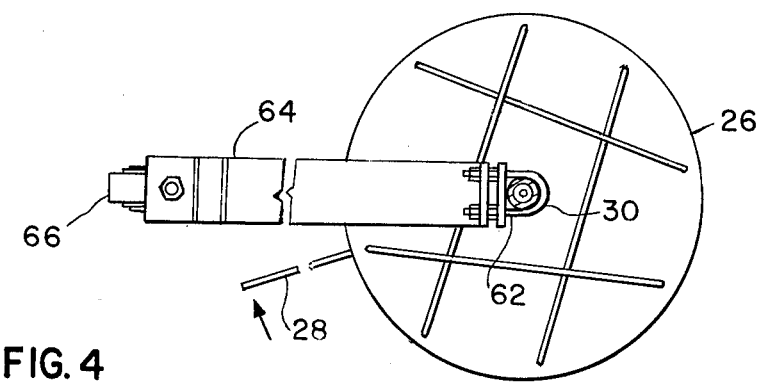
FIG. 4 is a plan detail of a modified embodiment.
Figure 5:
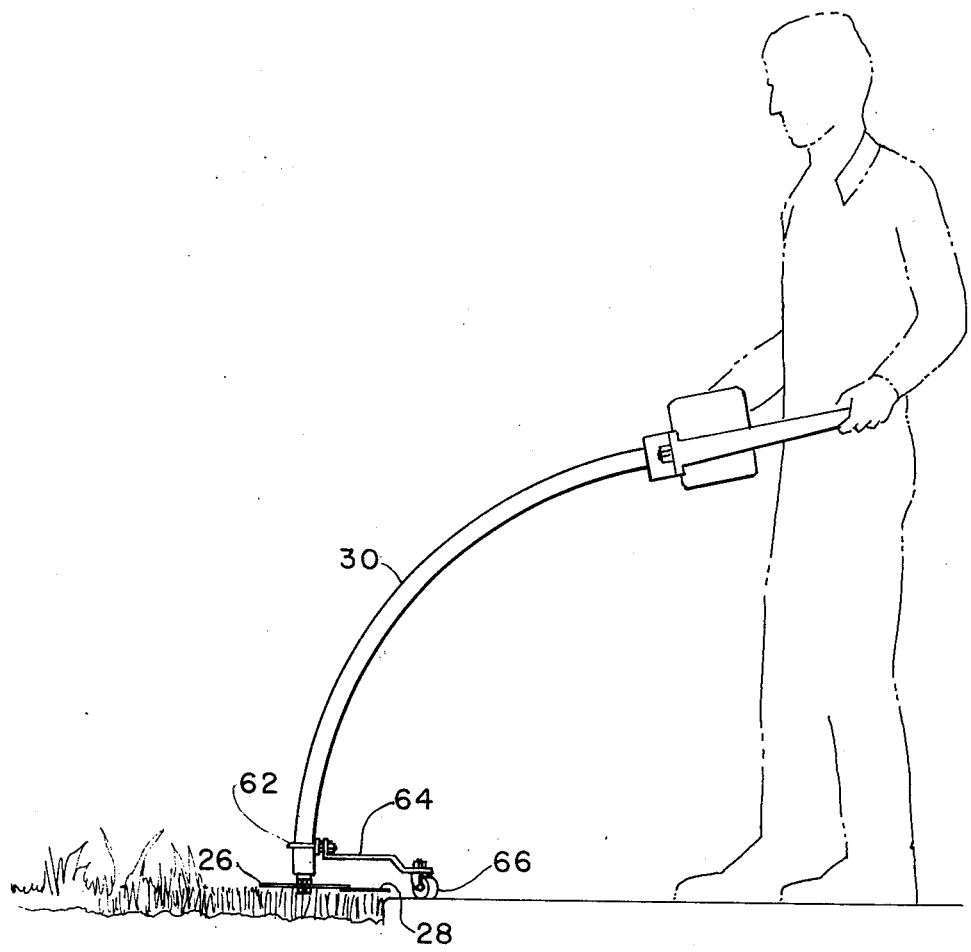
FIG. 5 is a perspective view showing the modified embodiment in use.

FIG. 1 shows the invention 10 in the form of an assembly comprising any of several commercially available chain saw drives 16 equipped with a unitary grass-cutting assembly 18. Typically, currently available portable chain saw drives have a pair of attachment studs 20, 22 or chain guard bar bolts laterally aligned with the output 24 of the chain saw engine, which is typically a shaft with a sprocket mounted on it.

A cutter head 26, preferably the circular type including a cutting filament 28, is rotated by the chain saw drive to which it is mounted by a subassembly including an arcuate downwardly curved tubular member 30 welded to a bracket 32 which engages the studs 20, 22, and has an integral handle 34 extending past the end of the chain saw drive.

A flexible drive rod or cable 36 connects at the lower end with a hole in the center of the cutter head, and couples to the chain saw drive at the upper end by means of corresponding fingers preferably in the form of a socket member 38 which has an axial recess shaped in complementary form to the sprocket.

The usual chain saw drive ring-shaped handle 40 provides a manual grip on the end opposite the rearwardly extending handle.

FIG. 2 indicates the structure making possible a preferred method of assembly of the flexible cable to the tubular member and to the output of the chain saw drive.

The lower end of the flexible cable 36 is threaded and has a sleeve 42 resting against the inner race of the bearing above and a nut 44 below the cutter head 26, gripping the cutter head on either side of the central hole 46.

Above this point, the tubular member 30 has a sealed anti-friction bearing 48 held by contact of the outer race 50 with a constriction 52 at the lowermost or vertical portion of the tubular member.

A shoulder 54 of the flexible cable rests on the inner race 56 of the anti-friction bearing, providing thrust retention of the flexible cable against downward motion.

The upper portions of the flexible cable are stabilized as they curve with the tubular member toward the horizontal by at least one and preferably several sleeve bearings 58, serially spaced by spacers 60 the first of which rests on the outer race of the anti-friction bearing, and which continue in succession above each sleeve bearing.

The spacers may be of bent plastic tubing such as polyethylene, or otherwise suitably fabricated. The sleeve bearings 58 are preferably of "Nylon" or other suitable plastic material impregnated with powdered lubricant such as molybdenum disulphide.

The socket 38 which is fixed as said to the flexible shaft, through axial support by the chain saw drive output provides thrust retention of the flexible shaft at the upper end. The flexible shaft is thus captured between the chain saw drive output and the anti-friction bearing.

FIG. 3 illustrates the socket recess finger structure 38' making engagement with the sprocket 24 simple, easy and strong and permitting efficient operation even if slightly misaligned.

It can be seen that fabrication and assembly of the grasscutting adapter unit in the above embodiment is quick and economical. The tubular member is rolled or otherwise upset to provide an inward flange or constriction at one end, and is then curved and welded to the one-piece bracket and handle, which bridge over the output, engage the studs and then terminate as a grip at the rear. Next the sealed anti-friction bearing is inserted into the tube, which it nearly fits in circumference, and is pushed to the end where it seats against the flange or contriction by the flexible cable on which the spacers and sleeve bearings have previously been assembled. Following this, the sleeve and nut are respectively slipped over and threaded on the end of the flexible shaft capturing and securing the cutter head between them. This sub-assembly is now a self-contained unit, ready for attachment to the chain saw drive by the two studs and immediate employment as a grass, weed and general green vegetation cutter.

FIGS. 3 and 4 illustrate a further embodiment in which the lower end of the tubular member 30 has an adjustable U-shaped clamp 62 around it. The threaded ends of the clamp support one end of an arm 64 which extends laterally and mounts a caster roller 66 clear of the cutter head 26 and the cutting length of the filament 28. Preferably the roller lies compactly in a balancing position under the arc of the tubular member, but by means of the clamp, the location of the caster can be set at any predetermined angle about the tubular member.

As indicated in the last Figure, this structure permits the adjustably supported cutter head to be moved freely on the roller in any lateral direction or tipped in any desired direction for trimming. If a filament-type cutter head with a smooth periphery is employed, tipping does not subject the user to the hazard of having the cutter head dig into the ground and move about. The caster support lessens the possibility of ground contact in any case, increasing ease as well as safety.

If desired, the U-clamp can be made to retain the anti-friction bearing by compressing the tubular member around the bearing periphery, eliminating the need for other constriction of the bore to retain the bearing and permitting assembly of the tubular member in another sequence, as, for example, installing the sealed anti-friction bearing after other components are in the tubular member.

Obviously many modifications and variations of the present invention are possible in light of the above teachings. It is, therefore, to be understood that within the scope of the appended claims the invention may be practiced otherwise than as specifically described.

What is claimed and desired to be protected by United States Letters Patent is:

1. The combination of a grass cutting adapter and a chain saw drive comprising: the chain saw drive including a motor with an output, a frame holding the motor and having at least one attachment point proximate the output; the grass cutting adapter comprising a detachable unitary assembly including: a cutter head, means for rotating the cutter head, including an elongate member, means for connecting the elongate member to the cutter head, means for supporting the elongate member rotatably, means for coupling the elongate member to the output including means for detachably attaching the supporting means to the attachment point, and means for manually grasping said combination for grass cutting, comprising a handle extending past the frame in a generally horizontal direction.

2. The combination recited in claim 1, the elongate member comprising a flexible shaft, the elongate member supporting means including a tubular member inclined at an angle below the horizontal in a downward arc terminating at the lower end proximate the cutter head in a vertically downward aspect, the means for attaching comprising a bracket extending from the attachment point laterally past the output, the bracket fixing the upper end of the tubular member proximate the output, and the means for manually grasping comprising a first handle extending from one end of the combination and a second handle extending from an end of the combination opposite the first handle.

3. The combination of a grass cutting adapter and a chain saw drive comprising: the chain saw drive including a motor with an output, a frame holding the motor and having at least one attachment point proximate the output; the grass cutting adapter including a cutter head, means for rotating the cutter head, including: a flexible shaft, means for connecting the flexible shaft to the cutter head, means for supporting the flexible shaft rotatably including a tubular member inclined at an angle below the horizontal in a downward arc terminating at the lower end proximate the cutter head in a vertically downward aspect, the lower end of the tubular member having a constriction of the bore thereof, a sealed anti-friction bearing having an inner race and an outer race positioned in tubular member lower end with the outer race thereof proximate said constriction, at least one spacer extending upwardly in the tubular member from the anti-friction bearing, a second bearing resting on said spacer, a second spacer above said second bearing, the flexible shaft having a downward facing shoulder resting on the inner race of the sealed anti-friction bearing and extending upwardly through the second bearing to said output, means for coupling the flexible shaft to the output including means for attaching the supporting means to the attachment point, comprising a bracket extending from the attachment point laterally past the output and fixing the upper end of the tubular member proximate the output, and means for manually grasping said combination for grass cutting comprising a first handle extending from one end of the combination and a second handle extending from an end of the combination opposite the first handle.

4. The combination recited, in claim 3, the second bearing being a sleeve bearing of thermoplastic material impregnated with powdered lubricant.

5. The combination recited in claim 3, the output comprising a sprocket, and the coupling means comprising a recessed member on the upper end of the flexible shaft, said recess complementary in shape to the sprocket and having the sprocket therein.

6. The combination recited in claim 5, the cutter head being a filament type cutter head with a circular shape.

7. The combination recited in claim 3, a sleeve on the flexible shaft positioned against said inner race, the cutter head having a hole centrally therethrough and the flexible shaft extending through the hole and having a fastener on the end thereof, below the hole, retaining the cutter head by forcing it upwardly against the sleeve.

8. The combination recited in claim 2, and means having attachment proximate the cutter head for supporting the combination.

9. The combination recited in claim 8, the means for supporting the combination comprising a roller, a mount, means for securing the mount to the tubular member, and means for securing the roller pivotally to the mount, whereby the cutter head can be moved laterally in all directions on said roller.

10. The combination recited in claim 9, the means for securing the mount to the tubular member including a clamp around the tubular member, an arm extending to the roller from the clamp, and means for tightening the clamp around the tubular member, whereby the arm and roller can be oriented to and fixed in a preselected position about the tubular member.

11. The combination recited in claim 9, the roller located substantially beneath the arc of the tubular member.

12. The combination of a grass cutting adapter and a chain saw drive comprising: the chain saw drive including a motor with an output, a frame holding the motor and having at least one attachment point proximate the output; the grass cutting adapter including a cutter head, means for rotating the cutter head, means for rotating the cutter head, including: a flexible shaft, means for connecting the flexible shaft to the cutter head, means for supporting the flexible shaft rotatably including a tubular member inclined at an angle below the horizontal in a downward arc terminating at the lower end proximate the cutter head in a vertically downward aspect, means for coupling the flexible shaft to the output including means for attaching the supporting means to the attachment point, comprising a bracket extending from the attachment point laterally past the output and fixing the upper end of the tubular member proximate the output, means for manually grasping said combination for grass cutting comprising a first handle extending from one end of the combination and a second handle extending from an end of the combination opposite the first handle, means proximate the cutter head for supporting the combination, including a roller located substantially beneath the arc of said tubular member, means for securing the roller pivotally to the mount, whereby the cutter can be moved laterally in all directions on said roller, the lower end of the tubular member having a sealed anti-friction bearing therein as part of the elongate member supporting means, and a clamp around the tubular member securing the sealed anti-friction bearing within the tubular member.

* * * * *